Oct. 30, 1962    J. R. CRAIG    3,061,729
X-RAY TUBE CURRENT METERING CIRCUIT
Filed Oct. 12, 1959
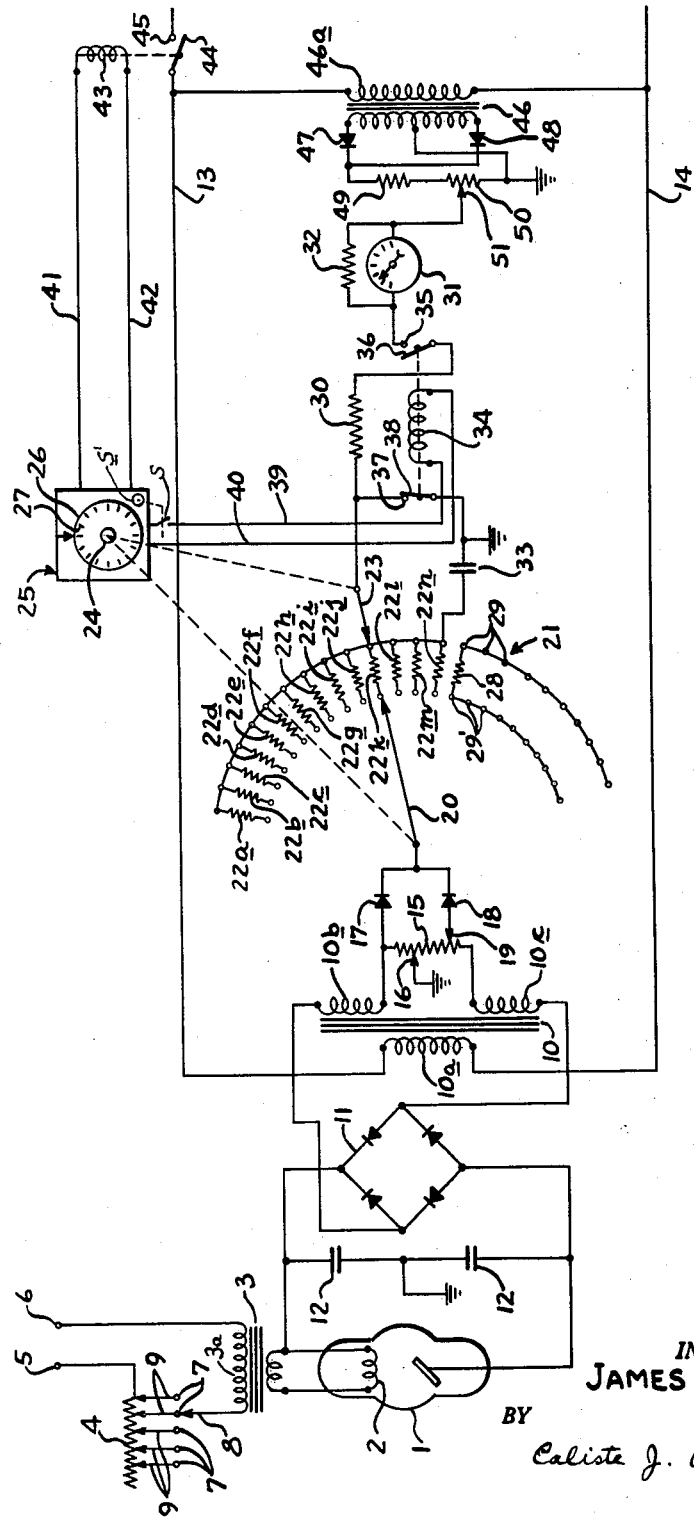
INVENTOR.
JAMES R. CRAIG
BY
Caliste J. Alster
ATTY.

United States Patent Office 3,061,729
Patented Oct. 30, 1962

3,061,729
X-RAY TUBE CURRENT METERING CIRCUIT
James R. Craig, Glenview, Ill., assignor to Profexray, Incorporated, Maywood, Ill., a corporation of Illinois
Filed Oct. 12, 1959, Ser. No. 845,824
12 Claims. (Cl. 250—95)

This invention relates in general to X-ray apparatus and, more particularly, to improvements in an X-ray tube current metering circuit.

In the operation of the X-ray apparatus it is desirable to measure the amount of current flowing through the X-ray tube during the time interval in which the tube is operating, and for this purpose it is necessary to employ a calibrated meter by which the X-ray technician can readily read the value of the tube current. The usual type of meter employed is a conventional milliammeter which is wired in the center-ground circuit of the X-ray transformer, and during the exposure period, the needle on this meter moves from the zero position to a position corresponding to the tube current. However, these milliammeters usually have a time constant in the order of 0.5 second with the result that when the exposures are very short, say in the order of 1/120 to 1/2 of a second the needle on the meter will not move a sufficient amount to register an accurate reading of the tube current. As a result of this problem with milliammeters, some pieces of X-ray equipment are supplied with milliampere-second (m.a.s.) meters which measure a quantity or charge of electricity passing therethrough, and in order for the technician to determine the tube current milliamperage, it is necessary to divide the m.a.s. reading by the exposure time.

While m.a.s. meters of this type are suitable for relatively short exposures (of the order of one second or less) they cannot be satisfactorily used for longer exposures since the total charge passing therethrough is so large that damage to the instrument might result. Therefore, it is also necessary to incorporate a milliammeter into the circuit so that the tube current readings for long exposures can be obtained. Moreover, m.a.s. meters are quite expensive and for this reason they are often eliminated from many pieces of X-ray equipment.

In X-ray equipment the current for the X-ray tube filament is usually supplied through a filament transformer which is in turn connected to a constant voltage source through a rheostat having adjustable selector taps whereby the tube current can be preselected by the X-ray technician. In calibrating the equipment the taps are adjusted so that when the tube current selector is set at a desired position, say 100 milliamperes, the milliammeter will give a reading of 100 milliamperes or the m.a.s. meter will give a reading corresponding to 100 milliamperes when the exposure is made. As the characteristics of the tube and other components of the circuit change during use of the equipment periodic checking and recalibration is required. However, in equipment wherein there is no m.a.s. meter, accurate readings of tube current can only be obtained by operating the tube at relatively long exposures (i.e. above one second) for each of the tube current settings of the selector. This procedure, therefore, may necessitate operating the tube for many seconds with the result that the life of the tube is materially shortened.

It is therefore an object of the present invention to provide an X-ray apparatus in which the meter circuit incorporates a single microammeter which accurately measures the tube current during both long and short exposures, thereby eliminating the need for a milliampere-second meter.

It is a further object of the present invention to provide an apparatus of the type stated wherein the X-ray timer is operatively associated with the meter circuit so that as the timer is set for any desired exposure the meter circuit parameters will be automatically preselected to enable the meter to indicate accurately the value of the tube current.

It is also an object of the present invention to provide an apparatus of the type stated in which the tube current selector may be tested and adjusted without the necessity of operating the tube for long time intervals.

The attainment of the above and further objects of the present invention will be apparent from the following specification taken in conjunction with the accompanying drawing forming a part thereof.

In the drawing:

The FIGURE indicates a circuit diagram which embodies the present invention.

Referring now in more detail and by reference characters to the drawing which illustrates a preferred embodiment of the present invention, 1 designates an X-ray tube having a filament 2, current for which is supplied from a filament transformer 3. The primary 3a of the transformer 3 is connected through a resistance 4 to leads 5, 6 which are, in turn, connected to a suitable constant voltage source. The resistance 4 is provided with a plurality of taps 7 which are selectable by a switch 8, and each tap 7 is adjustable along the resistance 4 by an adjustment tap 9. The switch 8 forms part of a tube-current selector which may be pre-set for the desired tube current prior to operating the tube 1. Current for the tube 1 is supplied through a transformer 10 having a primary 10a and series-connected secondary windings 10b, 10c, the latter windings being connected to the tube 1 through a full wave rectifier including a bridge 11 and capacitance 12, 12 which represents the leakage capacitance of the windings to the transformer 10 and the high voltage cables in the tube circuit. The primary 10a is connected through leads 13, 14 to an autotransformer (not shown) or the like in the manner well known in the art, whereby the voltage across the primary 10a may be varied.

In the circuit of the secondary windings 10b, 10c a resistance 15 is provided, and the resistance 15 has an adjustable tap 16 which is grounded as shown. Two opposed selenium diodes 17, 18 are connected across the resistance 15, the diode 18 being connected to the resistance 15 through an adjustable tap 19. The negative side of the diodes 17, 18 are each connected to a contactor 20 which forms part of a resistor-selector, generally designated as 21.

The selector 21 includes a plurality of resistors 22a, 22b, 22c, etc. of progressively increasing values and each resistor 22a, 22b, 22c, etc. is also selectively contactable by a contactor 23. The contactors 20, 23 are each preferably mounted on and rotatable with the dial shaft 24 of an X-ray timer 25. Furthermore, the dial shaft 24 is provided with a conventional timer dial 26 having graduated markings 27. Also forming part of a selector 21 is a resistor 28 which is selectively contactable by the timers 20, 23 in any one of a plurality of contact points 29, 29'. Thus, as the dial shaft 24 is turned through a range of time settings the contactors 20, 23 will selectively contact the resistors 22a, 22b, 22c, etc., one resistor 22a, 22b, 22c, etc. corresponding to one time setting of the timer, and for the remaining time settings of the time, namely, any set of contact points 29, 29', the contactors 20, 23 will contact the resistor 28, all for purposes presently more fully appearing.

In series with the contactor 23 is a high resistance 30 and a microammeter 31 calibrated in milliamperes, and shunted across the microammeter 31 is a damping resistor 32. Connected in series with any one of the selected resistors 22a, 22b, 22c, etc. is a capacitor 33 which is also shunted across the meter 31. The capacitor-meter circuit is opened and closed by a relay having a relay coil 34 which, when energized, closes normally open relay contacts 35 and 36. Moreover, the relay coil 34 opens normally closed relay contacts 37, 38 to open the ground-discharge circuit of the capacitor 33. The relay coil 34 is energized through leads 39, 40 which are connected to a switch s, the latter being controlled by a conventional hand switch s', which initiates the operation of the timer 25 and, in effect, forms a part thereof. Furthermore, the timer 25 is connected through leads 41, 42 to a relay coil 43 to open, and close contacts 44, 45 for purposes of supplying current to the primary 10a during the time interval in which the tube 1 is to operate, which interval is controlled by the setting of the timer 25.

As those skilled in the art will well understand, the relay 34 is of the type ordinarily employed in the conventional series meter circuit and is controlled by the switch s for purposes of opening and closing the meter circuit, the relay coil being energized as long as said hand switch s' is held closed by the person operating the equipment. Therefore, since this circuitry, as well as the details of construction and operation of the timer 25 is well known, these features are not shown or described in detail herein.

Connected to the leads 13, 14 and in parallel with the primary 10a is the primary 46a of a transformer 46. The secondary 46b of the transformer 46 is connected through opposed diodes 47, 48 to a resistor 49 and a potentiometer 50 having a variable tap 51. Furthermore, the secondary 46b is provided with a center tap 52 which is grounded as shown.

By way of example but not of limitation, the following values of components for the meter circuit have been found suitable and are indicated in the table below, each component being followed by its reference numeral herein in parentheses and resistors being indicated as "R."

| Circuit Component | Component Value | Corresponding Timer Setting (Sec.) |
| --- | --- | --- |
| Meter (31) | 0–30 microamperes | |
| R (15) | 100 ohms | |
| R (30) | 3 megohms | |
| R (32) | 22,000 ohms | |
| R (49) | 22,000 ohms | |
| Pot. (50) | 5,000 ohms | |
| Capacitor (33) | 10 microfarads | |
| R (22a) | 1,000 ohms | 1/120 |
| R (22b) | 2,000 ohms | 1/60 |
| R (22c) | 3,000 ohms | 1/40 |
| R (22d) | 4,000 ohms | 1/30 |
| R (22e) | 6,000 ohms | 1/20 |
| R (22f) | 7,500 ohms | 1/15 |
| R (22g) | 12,000 ohms | 1/10 |
| R (22h) | 18,000 ohms | 3/20 |
| R (22i) | 24,000 ohms | 1/5 |
| R (22j) | 36,000 ohms | 3/10 |
| R (22k) | 48,000 ohms | 2/5 |
| R (22l) | 60,000 ohms | 1/2 |
| R (22m) | 72,000 ohms | 3/5 |
| R (22n) | 96,000 ohms | 4/5 |
| R (28) | 2.2 megohms | 1 |

The several sets of contact points 29, 29' represent a series of settings on the timer greater than one second and may, for example, range from 1 to 8 seconds. It will be noted from the above table that the ohmic values of the several resistors 22a, 22b, 22c, etc. progressively increase for increased time-interval settings of the timer 25. However, for time settings of one second or higher the resistor 28 will be in series with the meter 31, and the resistors 22a, 22b, 22c, etc. and capacitor 33 will be out of the meter circuit.

In operation, the switch 8 is moved to select the desired tube current. Then the timer dial 26 is turned, rotating the timer shaft 24 so as to select the desired time interval during which the tube 1 is to operate. For instance, if the exposure is to be 2/5 second, then resistor 22k will be selected as shown in the drawing. When the timer is switched on by the hand switch s', the contacts 44, 45 will close and current will be supplied to the primary 10a. At the same time the contacts 35, 36 close and contacts 37, 38 open. Current will, therefore, flow through the secondaries 10b, 10c and resistor 15. In each half cycle, the current will be rectified by the diodes 17, 18 and a D.C. voltage will appear across the series circuit formed by the resistor 22k and capacitor 33, thereby charging the capacitor 33. This voltage will be a function of the current flowing through the tube 1. Since the capacitor 33 is shunted across the resistor 30 and meter 31, the meter will measure the voltage across the capacitor 33, and the needle on the meter 31 will swing to the position indicating this voltage. However, since the meter 31 is calibrated in milliamperes and the voltage across the capacitor 33 is a function of the tube current, the value of the tube current may be read directly from the meter 31.

The capacitor 33 will discharge through the meter 31 quite slowly since the high resistance 30 limits the current flow through the capacitance-meter circuit with the result that the discharge time constant of the capacitor 33 is long. Consequently, the resistance 30 and meter 31 constitute a high impedance voltage-measuring device across the capacitor 33. This impedance must be sufficiently high so that there is only negligible capacitor discharge during the time interval equal to the time constant of the meter 31. At the end of the time interval of the exposure the timer 25 will cause the contacts 44, 45 to open. The hand switch s' is held closed for a few seconds, keeping the switch s closed and maintaining the relay coil 34 energized. This keeps the meter circuit closed long enough to enable the meter to be read. When the hand switch s' is released the meter circuit is opened and the capacitor 33 becomes grounded out.

The fact that the ohmic value of the resistor 22a, 22b, 22c, etc. selected increases as the exposure time setting increases results in a different time constant for the R-C circuit through which the capacitor 33 is charged. Therefore, during short exposures the capacitor 33 will be charged more quickly than during long exposures. These ohmic values of the resistances 22a, 22b, 22c, etc. are such that the voltage across the capacitor 33 at the end of any selected time interval, less than one second, will be the same, assuming, of course, the same voltage drop across said R-C series circuit. Consequently, irrespective of the setting of the timer in the range below one second, the meter 31 will always indicate the correct milliamperage through the tube 1.

For timer settings of one second or higher the contacts 20, 23 place the resistor 28 in series with the meter 31 and by-pass the capacitance 33. This is possible since for long exposures (or the order of one second or greater) the time constant of the meter 31 is sufficiently high so that it can be used as an ordinary series meter. Most important, however, is the fact that in the present invention a single microammeter is used for the current readings at both short and long exposures.

Since the specified capacitance of condensers vary within certain manufacturing tolerances, the taps 16, 19 are made adjustable. Initially the tap 19 is adjusted and thereafter the tap 16 is adjusted to center tap the portion of the resistor 15 across the diodes 17, 18. In this way the circuit remains balanced.

When current is delivered to the primary 10a it is also supplied to the transformer 46. The current in the secondary 46b is rectified by diodes 47, 48 and as a result a D.C. voltage will appear across the potentiometer 50 from the center tap 51 to ground. This voltage opposes the voltage across the capacitance. The potentiometer tap 51 is adjusted so that this voltage will correspond to the stray or leakage current resulting from the leakage capacitance 12. Thus, the leakage capacitance is balanced out of the meter circuit and an accurate reading of tube current is obtained.

In making periodic servicing adjustments of the X-ray apparatus the taps 9 can be adjusted and the tube current checked using exposure time as low as 1/120 second. Since each position of the switch 8 may be checked several times during this procedure, it is desirable to test the circuit using exposure times as low as possible commensurate with obtaining accurate results. Since the present invention permits the use of shorter exposure time than would be possible if a conventional series meter circuit were used, X-ray tube life is not wastefully dissipated during this type of servicing procedure.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. In a circuit including an X-ray tube, means for supplying current to the tube, and adjustable timer means associated with said means for controlling the time interval during which the tube operates; a resistance-capacitance series circuit, means operatively associated with the timer means for varying the time constant of said resistance-capacitance circuit in accordance with the time-setting of the timer means, means coupled to said tube-current supply means for providing D.C. voltage across the resistance-capacitance circuit to charge said capacitance, and calibrated metering means across which the capacitance is shunted for measuring the voltage thereacross, said voltage being a function of the current flowing through the tube.

2. In a circuit including an X-ray tube, means for supplying current to the tube, and adjustable timer means associated with said means for controlling the time interval during which the tube operates; a resistance-capacitance circuit, means operatively associated with said timer means for increasing the time constant of said resistance-capacitance circuit in accordance with increased time-settings of the timer means, means for providing D.C. voltage across the resistance-capacitance circuit which is a function of the tube current to charge said capacitance, and calibrated metering means across which the capacitance is shunted for giving an indication of the current flowing through the tube.

3. In a circuit including an X-ray tube and means for supplying current to the tube, a resistance and a capacitance in series, means responsive to the current flowing through the tube for providing D.C. voltage across the resistance-capacitance circuit which is a function of the tube current to charge the capacitance, a meter circuit including high impedance metering means, said capacitance being shunted across said meter circuit whereby the metering means will measure the voltage across the capacitance and give an indication of the current flowing through the tube, and adjustable timer means for controlling the operation of the tube-current supply means and for automatically preadjusting the time constant of said resistance-capacitance circuit in accordance with the exposure setting of said timer means.

4. In an apparatus having an X-ray tube, means including a transformer with a secondary for supplying current to the tube, and calibrated timer means for permitting current to be supplied to the transformer during the selected time interval in which the tube is to operate; a capacitance and a plurality of resistances, selector means for connecting any one of said resistances in series with the capictance, means coupled to said secondary for providing D.C. voltage across the circuit formed by the selected resistance and capacitance to change the capacitance when current is supplied to said transformer, said selector means being operatively associated with the timer means for selecting a resistance in accordance with the time setting on the timer means, and calibrated metering means across which the capacitance is shunted.

5. In an apparatus having an X-ray tube, means including a transformer with a secondary for supplying current to the tube, and calibrated timer means for permitting current to be supplied to the transformer during the selected time interval in which the tube is to operate; a capacitance and a plurality of resistances, selector means for connecting any one of said resistances in series with the capacitance, means coupled to said secondary for providing D.C. voltage which is a function of the tube current across the circuit formed by the selected resistance and capacitance to charge the capacitance when current is supplied to said transformer, said selector means being operatively associated with the timer means for selecting a resistance in accordance with the time setting on the timer means, the ohmic values of said resistances increasing for increasing time settings of the timer means, and calibrated metering means across which the capacitance is shunted for measuring the voltage across the capacitance and thereby indicate the tube current, the impedance of the metering means being sufficiently high so that voltage across the capacitance will remain substantially constant during an interval equal to the time constant of the metering means.

6. In an apparatus having an X-ray tube, means including a transformer with a secondary for supplying current to the tube, and calibrated timer means for permitting current to be supplied to the transformer during the selected time interval in which the tube is to operate; a capacitance and a plurality of resistances, selector means for connecting any one of said resistances in series with the capacitance, means coupled to said secondary for providing D.C. voltage which is a function of the tube current across the circuit formed by the selected resistance and capacitance when current is supplied to said transformer, said selector means being operatively associated with the timer means for automatically selecting the resistance means in accordance with the time setting on the timer means throughout a range of exposure-time settings on the timer means, calibrated metering means across which the capacitance is shunted for measuring the voltage across said capacitance and thereby indicate the tube current value, and said selector means being operable to select a resistance for connection with the metering means in a series circuit by-passing said capacitor throughout a range of time settings of the timer means which range includes exposure time settings greater than the exposure-time settings in the first mentioned range.

7. Apparatus according to claim 6 wherein the metering means is a microammeter and a high resistance in series therewith.

8. In an apparatus having an X-ray tube, means for supplying current to the tube, and calibrated timer means for permitting current to be supplied from said tube-current supply means to the tube during the time interval in which the tube is to operate; a capacitance, a plurality of resistances corresponding respectively to settings on the timer means with ohmic values of said resistances increasing for increasing time settings on the timer means, selector means for connecting any one of said resistances in series with the capacitance in accordance with the time setting on the timer means, means responsive to the tube-current for providing a D.C. voltage, which is a function of the tube current, across the circuit formed by the selected resistance and the capicitance, and high impedance voltage-measuring means shunted across the capacitance to measure the voltage across the capacitance and thereby indicate the current through the X-ray tube, the impedance of the voltage-measuring means being sufficiently high so that the voltage across the capacitance will remain substantially constant during an interval equal to the time constant of the voltage-measuring means.

9. In an apparatus including an X-ray tube, means for supplying current to the X-ray tube, and calibrated timer means for permitting current to be supplied to the X-ray tube from the tube-current supply means during the time interval in which the tube is to operate; a circuit including resistance and capacitance, selector means for increasing the time constant of said circuit in accordance with increased time settings on the timer means, means responsive to the current through the X-ray tube for providing a D.C. voltage, across the circuit to charge the capacitance, said D.C. voltage being a function of the current through the tube, and a metering circuit including a calibrated instrument, said metering circuit being shunted across the capacitance, the instrument serving to indicate the voltage across the capacitance and thereby indicate the tube current, the impedance of the metering circuit being sufficiently high so that the voltage across the capacitance will remain susbtantially constant during an interval equal to the time constant of the instrument.

10. Apparatus according to claim 9 wherein the timer means includes a movable time-setting member and the selector means comprises a switch in mechanical connection with the time-setting member for automatically pre-adjusting the time constant of the circuit for each of selected settings of the time-setting member.

11. In an X-ray apparatus having means for supplying current to an X-ray tube and a timer for controlling the time interval of operation of the tube-current supply means; a resistance-capacitance circuit, selector means for increasing the time constant of the circuit in accordance with increased time settings on the timer, means connected to the tube-current supply means for providing a D.C. voltage across said circuit to charge the capacitance, and a metering circuit including a calibrated instrument, said metering circuit being shunted across the capacitance and having an impedance sufficiently high so that the voltage across the capacitance will remain substantially constant during an interval equal to the time constant of the instrument.

12. Appartus according to claim 11 wherein the selector means is mechanically coupled to the timer to adjust automatically the time constant of the resistance-capacitance circuit in accordance with the time-setting on the timer.

References Cited in the file of this patent
UNITED STATES PATENTS

| | | |
|---|---|---|
| 2,231,622 | Graves | Feb. 11, 1941 |
| 2,351,486 | Constable | June 13, 1944 |
| 2,353,979 | Weisglass | July 18, 1944 |
| 2,512,193 | Zavales | June 20, 1950 |
| 2,668,909 | Johnston | Feb. 9, 1954 |
| 2,840,718 | Wright | June 24, 1958 |